(12) United States Patent
Edwards et al.

(10) Patent No.: US 8,886,389 B2
(45) Date of Patent: Nov. 11, 2014

(54) METHOD OF PROVIDING DIRECTIONS TO A VEHICLE SERVICE FACILITY

(75) Inventors: Ryan M. Edwards, Macomb, MI (US); James J. Kelly, III, Ferndale, MI (US)

(73) Assignee: General Motors LLC, Detroit, MI (US)

( * ) Notice: Subject to any disclaimer, the term of this patent is extended or adjusted under 35 U.S.C. 154(b) by 556 days.

(21) Appl. No.: 12/944,232

(22) Filed: Nov. 11, 2010

(65) Prior Publication Data
US 2012/0123629 A1    May 17, 2012

(51) Int. Cl.
*G06F 7/00* (2006.01)
*G01C 21/00* (2006.01)

(52) U.S. Cl.
USPC .................. 701/29.1; 701/431; 455/404.2

(58) Field of Classification Search
USPC .................. 701/30, 29.1, 431; 455/404.2
See application file for complete search history.

(56) References Cited

U.S. PATENT DOCUMENTS

| | | | |
|---|---|---|---|
| 8,032,296 B2 * | 10/2011 | Bucchieri | 701/423 |
| 8,090,598 B2 * | 1/2012 | Bauer et al. | 705/4 |
| 8,285,611 B2 * | 10/2012 | Fuller et al. | 705/34 |
| 2002/0049535 A1 * | 4/2002 | Rigo et al. | 701/211 |
| 2003/0171964 A1 * | 9/2003 | Center et al. | 705/8 |
| 2003/0210806 A1 * | 11/2003 | Yoichi et al. | 382/104 |
| 2004/0117195 A1 * | 6/2004 | Bodin | 705/1 |
| 2004/0192339 A1 * | 9/2004 | Wilson et al. | 455/456.1 |
| 2005/0222754 A1 * | 10/2005 | Meisler et al. | 701/200 |
| 2007/0043487 A1 * | 2/2007 | Krzystofczyk et al. | 701/30 |
| 2007/0156311 A1 * | 7/2007 | Elcock et al. | 701/29 |
| 2008/0288315 A1 * | 11/2008 | Bodin | 705/7 |
| 2008/0297488 A1 * | 12/2008 | Operowsky et al. | 345/173 |
| 2010/0042498 A1 * | 2/2010 | Schalk | 705/14.52 |
| 2010/0153207 A1 * | 6/2010 | Roberts et al. | 705/14.41 |
| 2010/0332324 A1 * | 12/2010 | Khosravy et al. | 705/14.53 |
| 2011/0130958 A1 * | 6/2011 | Stahl et al. | 701/201 |
| 2012/0029759 A1 * | 2/2012 | Suh et al. | 701/29 |

* cited by examiner

*Primary Examiner* — Tuan C. To
(74) *Attorney, Agent, or Firm* — Anthony Luke Simon; Reising Ethington P.C.

(57) ABSTRACT

A method of providing directions to a vehicle service facility includes generating a vehicle service alert that includes vehicle operating data, sending the vehicle service alert to a vehicle telematics service subscriber, offering the vehicle telematics service subscriber a choice of one or more vehicle service facilities for responding to the vehicle service alert, and if the vehicle owner chooses a vehicle service facility, providing turn-by-turn directions to the chosen vehicle service facility.

16 Claims, 2 Drawing Sheets

METHOD OF PROVIDING DIRECTIONS TO A VEHICLE SERVICE FACILITY

TECHNICAL FIELD

The present invention relates generally to vehicles and more specifically to a method of providing directions to a vehicle service facility.

BACKGROUND OF THE INVENTION

Telematics units are now widely in use on vehicles to provide various types of information. Various vehicle operating conditions can be monitored by a call center via the telematics device. For example, vehicle data such as diagnostic trouble codes (DTCs) can be reported to the call center. The DTCs can be analyzed and the result of that analysis may be reported to a vehicle owner or other authorized person. This report can include information concerning vehicle issues that the vehicle owner may remedy.

SUMMARY OF THE INVENTION

According to an aspect of the invention, a method of providing directions to a vehicle service facility is given. The steps comprise generating a vehicle service alert that includes vehicle operating data, sending the vehicle service alert to a vehicle telematics service subscriber, offering the vehicle telematics service subscriber a choice of one or more vehicle service facilities for responding to the vehicle service alert, and if the vehicle owner chooses a vehicle service facility, providing turn-by-turn directions to the chosen vehicle service facility.

According to another aspect of the invention, a method of providing directions to a vehicle service facility is given. The steps comprise generating a vehicle service alert that includes vehicle operating data for a vehicle; sending the vehicle service alert to a vehicle telematics service subscriber; obtaining the location of the vehicle; determining whether the vehicle is covered by a vehicle warranty; if so, then offering the vehicle telematics service subscriber a choice of one or more vehicle dealerships for responding to the vehicle service alert; and after the vehicle telematics service subscriber chooses a vehicle dealership, providing turn-by-turn directions from the location of the vehicle to the chosen vehicle dealership; otherwise, offering the vehicle telematics service subscriber a choice of one or more aftermarket vehicle service providers in addition to one or more dealerships; and if the vehicle telematics service subscriber chooses either a vehicle dealership or an aftermarket vehicle service provider, then providing turn-by-turn directions from the location of the vehicle to the chosen dealership or aftermarket vehicle service provider.

According to yet another aspect of the invention, a method of providing directions to a vehicle service facility is given. The steps comprise sending a vehicle telematics service subscriber an email message that includes service alerts for a vehicle operated by the vehicle telematics service subscriber; offering the vehicle telematics service subscriber a choice of one or more vehicle service facilities capable of responding to each service alert included in the email based on the type of service alert; receiving from the vehicle telematics service subscriber a chosen selection from among the offered vehicle service facilities; determining the location of the vehicle operated by the vehicle telematics service subscriber; generating turn-by-turn directions between the location of the vehicle and the chosen selection; and presenting the turn-by-turn directions to the vehicle telematics service subscriber.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
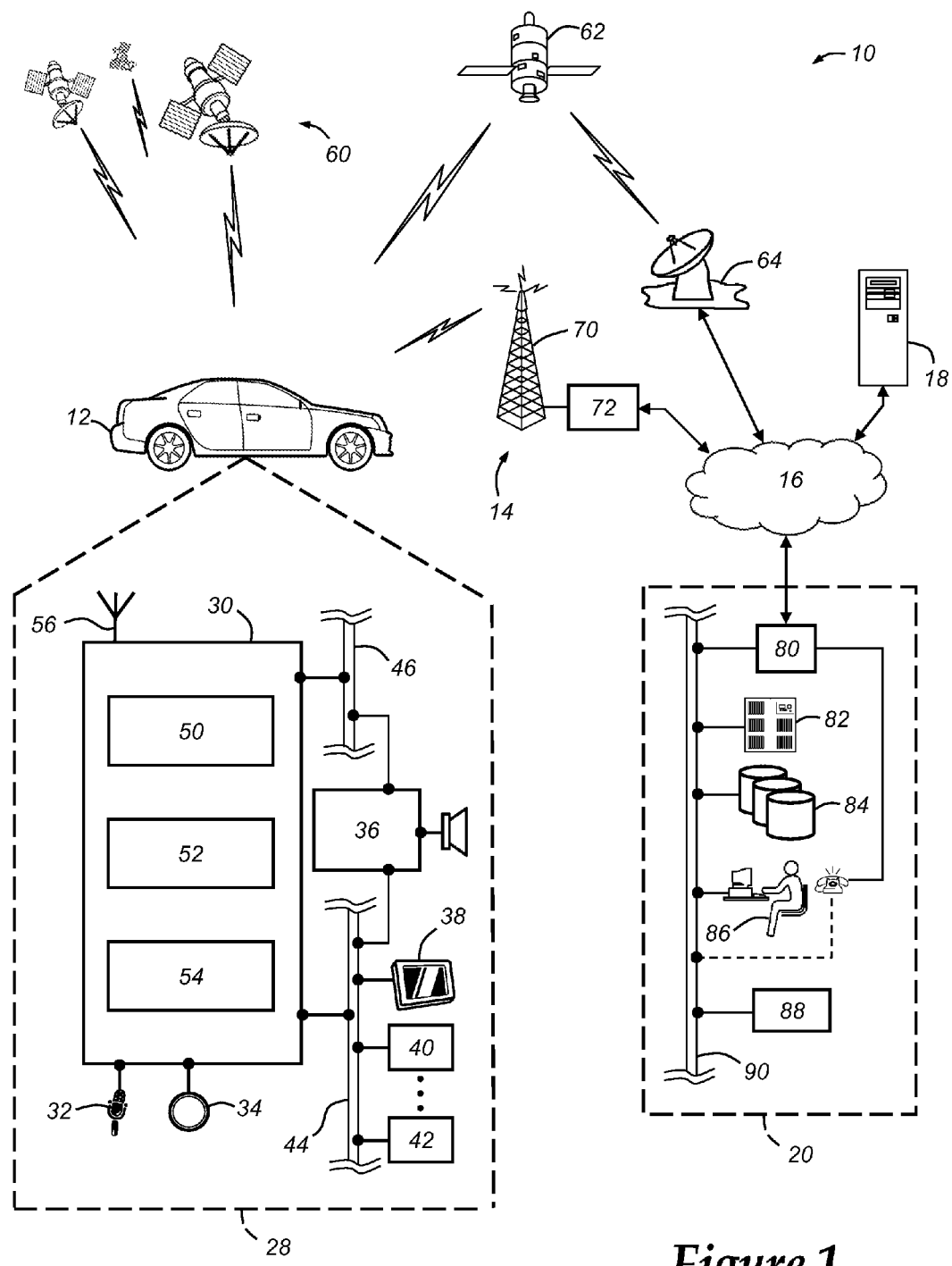
FIG. 1 is a block diagram depicting an exemplary embodiment of a communications system that is capable of utilizing the method disclosed herein.

The method described below identifies vehicle service facilities capable of addressing vehicle service alerts. Given the location-determining capabilities of a telematics unit, a vehicle location can be determined with respect to identified vehicle service facilities. The identity and location of one or more of these vehicle service facilities can then be delivered to a vehicle telematics service subscriber (such as a vehicle owner or other authorized person) and geographical directions between vehicle location (or other geographic point, such as an address) and any one of the vehicle service facilities can be provided to the subscriber. That is, the vehicle telematics service subscriber may receive a message, such as an email, that includes one or more service alerts for a vehicle. For each vehicle service alert, one or more nearby vehicle service facilities can be identified thereby providing the vehicle telematics service subscriber a means to address the alert.

Vehicle service facilities include vehicle dealerships as well as other service providers, such as gas stations or aftermarket vehicle service facilities. While some types of vehicle service alerts may benefit from vehicle dealership attention, other alerts can be quickly attended to by any one of a number of other service providers. Thus, the vehicle telematics service subscriber can be given one or more vehicle service facility options that may depend on the type of received service alert. For instance, the vehicle service alert may indicate that a vehicle suffers from engine trouble. It is possible that a limited number of vehicle service facilities, such as vehicle dealerships, may be competent or able to repair such trouble. In that case, one or more vehicle service facilities can be identified based on their ability to diagnose and/or repair engine troubles and the identity of those facilities can be provided to the vehicle telematics service subscriber.

On the other hand, the vehicle service alert could identify a tire inflated at a less-than-optimal pressure value. In that case, it may not be necessary or convenient for the vehicle telematics service subscriber to drive his vehicle to a dealership in order to satisfactorily inflate the vehicle's tires. While the vehicle telematics service subscriber could visit the dealership, it may be more convenient to obtain compressed air from an aftermarket vehicle service provider, such as a vehicle parts store, local/independent vehicle mechanic, or gas station. And along with the identified vehicle service facilities, driving directions to those facilities can also be provided. That way, the vehicle telematics service subscriber can receive the identities and locations of one or more service facilities that can fill vehicle tires with air (or provide other services depending on the alert) and proceed to the facility of his or her choice. Theoretically, the number of vehicle service facility options for providing compressed air may be more abundant than those that are capable of resolving engine trouble. So identifying the type of vehicle service alert can potentially increase the number of vehicle service facility options available to the vehicle telematics service subscriber. Given the one or more vehicle service facilities from which the vehicle telematics service subscriber can choose, the subscriber can select one and have driving directions or geographical directions provided based on that selection. Conveniently delivering these directions can make servicing the vehicle more likely and convenient.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 can be an OEM-installed (embedded) or aftermarket device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
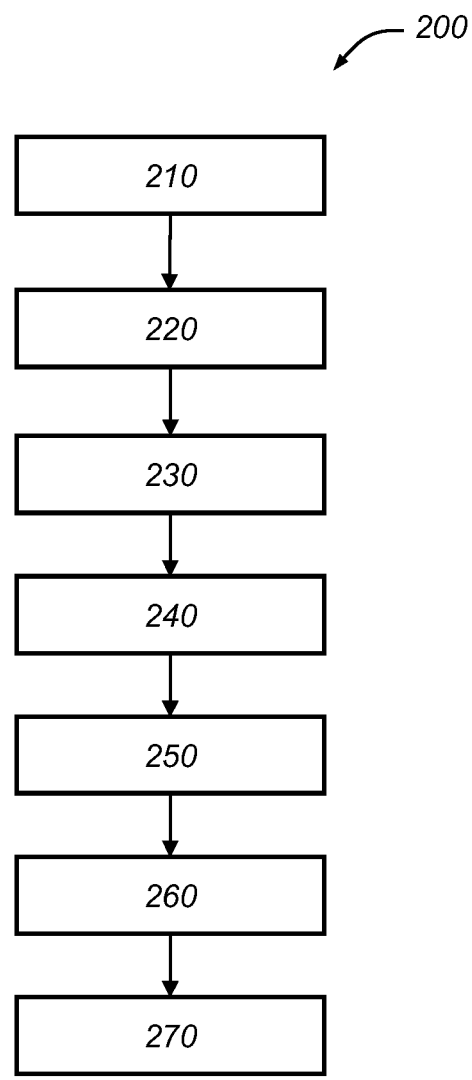
FIG. 2 is a flow chart for a method of providing directions to a vehicle service facility.

Turning now to FIG. 2, there is shown a method 200 of providing directions to a vehicle service facility. The method 200 begins at step 210 by generating a vehicle service alert that includes vehicle operating data. A service alert, such as a diagnostic result, can be specific information concerning a monitored vehicle component, system, or operating condition. A specific diagnostic result could be, for example, the amount of oil life remaining (e.g., on a percentage basis 0-100%). Vehicle data, such as vehicle operating data, can be used to generate diagnostic results and include vehicle operational information that is generated by and/or obtained from the vehicle 12. Examples of vehicle data include tire pressure values, fuel levels, whether or not exterior vehicle lights are operational, or any type of DTC generated by the vehicle 12. The vehicle data can be transmitted to the call center 20 or service center computer via the wireless carrier system 14. This data can be collected after the occurrence of a trigger or can be requested at the vehicle 12 or the call center 20. At the call center 20 or service center computer, service alerts or diagnostic results can be generated using the vehicle data. Examples of diagnostic results and vehicle data—as well as email messages referred to below—can be found in U.S. Patent Application Publication No. 2007/0173992 filed Dec. 29, 2006 and titled Vehicle Email Notification System an Method, the entire contents of which are hereby incorporated by reference. The method proceeds to step 220.

At step 220, a vehicle telematics service subscriber is sent an email message that includes service alerts for a vehicle 12 operated by the vehicle telematics service subscriber. An email message can include diverse types of dynamic vehicle information for the vehicle telematics service subscriber as is described in U.S. Patent Application Publication No. 2007/0173992. For instance, the email message can be formatted into a variety of regions, each involving a particular type of information. Those regions can include basic vehicle and introductory information, diagnostic information, maintenance information, a notification region (e.g. possible vehicle recalls, ancillary services, and vehicle telematics subscription information), and a miscellaneous section. At least one of the regions can include an identified type of vehicle service alert, such as tire pressure, oil change status, or other diagnostic result based on a DTC generated by the vehicle 12. The step of identifying or classifying vehicle service alerts can be carried out at the call center 20 or any other central facility. One or more of these regions can also include information that identifies the name of one or more vehicle service facilities. The method 200 proceeds to step 230.

At step 230, the vehicle telematics service subscriber is offered a choice of one or more vehicle service facilities capable of responding to each service alert included in the email message based on the type of alert. This can involve identifying one or more vehicle service facilities within a predetermined distance from the vehicle 12 or within a predetermined distance from a geographical address specified by the vehicle telematics service subscriber. For example, the call center 20 or other message-generating system, such as an electronic message generating system (EMGS), can identify the location of the vehicle 12 (or address) and identify the vehicle service facilities within a given range of that location (e.g. 30 miles). Vehicle service facilities can include vehicle dealerships and aftermarket vehicle service providers as described above, to name some examples. And each of these can be identified by and/or searched for using the type of services they provide and/or their location. It is possible to maintain a database at a central facility, such as call center 20, which can be accessed to identify both the vehicle service facilities and the type of service(s) they provide. In one example, the identity of a vehicle dealership can be saved using its name and location as well as a list of services that the dealership offers or is willing to provide. That dealership may be able to perform routine maintenance, such as oil changes, air filter replacement, spark plug replacement, tire service/rotations, or vehicle cleaning services. However, that dealership may also offer more complex services, such as advanced engine diagnosis and collision repair. So, each service offered by the dealership can be categorized and associated with a vehicle service alert when the identity of that dealership is saved in the database. For instance, this can mean identifying the type of vehicle alert, such as tire pressure, oil change, or an engine check DTC, and identifying one or more vehicle service facilities in the area capable of responding to the vehicle service alert. The step of identifying vehicle service alerts and/or vehicle service facilities can be carried out at the call center 20 or any other central facility.

When a vehicle 12 generates a particular vehicle service alert, it can be cross-referenced with the vehicle service alerts categorized or associated with the dealership to determine if that dealership (or other aftermarket vehicle service provider) would be able to assist with a particular vehicle service alert.

On one hand, an aftermarket vehicle service provider, such as a gas station, may only offer compressed air that a vehicle telematics service subscriber can use to fill the vehicle's tires with air. In that case, the gas station can be categorized as only providing compressed air and when a vehicle generates a service alert associated with tire pressure, the gas station can be identified as a vehicle service facility able to offer assistance. On the other hand, if the vehicle service alert indicates that the vehicle 12 could benefit from an oil change, the gas station may not be offered to the vehicle telematics service subscriber as an available vehicle service facility because the gas station may not be categorized as having the ability to provide oil change services. As a result, the vehicle telematics service subscriber may only be offered vehicle service facilities that are able to perform the needed service(s).

It is possible that a minimum capability threshold can be established with respect to offering vehicle service facilities to the vehicle telematics service subscriber. This threshold can be optionally-selected to limit the type of offered vehicle service facility to facilities can remedy all of the vehicle service alerts contained in the email message. In one example, that means that method 200 may only offer vehicle service facilities that can service the most complex vehicle service alerts as well as the most minor that are included in the email message. For example, an email message can include one vehicle service alert recommending an oil change and another recommending the investigation of a check engine light. While a vehicle dealership may be able to both change the oil in the vehicle 12 and investigate the check engine light, a gas station may only be able to change the oil. So in order to prevent visiting more than one vehicle service facility, the vehicle telematics service subscriber may wish that the vehicle service facilities that are unable to remedy all of the vehicle service alerts not be offered.

It can be determined whether the vehicle 12 is covered by a vehicle warranty and if so, whether that warranty covers the type of vehicle service alert included in the email. In that case, it can be determined which vehicle service facilities within a predetermined area of the vehicle 12 honor that vehicle warranty and will remedy the vehicle service alert for free or for a reduced cost. The vehicle telematics service subscriber can then be offered only vehicle service facilities that honor the vehicle warranty. It is also possible to provide a description of the warranty coverage to the vehicle telematics service subscriber along with the vehicle service alert. Information indicating the type of warranty coverage for the vehicle 12 can be maintained at a central facility, such as a call center 20.

After identifying the service facilities nearby the vehicle 12 and their offered services, those facilities can be graphically displayed to the vehicle telematics service subscriber. This can involve presenting the name of one or more vehicle service facilities, their contact information, a map of their location, hours of operation, and/or other information the vehicle telematics service subscriber may find useful to locate/communicate with the vehicle service facilities on a graphical display. The graphical display can be located in the vehicle 12, such as visual display 38, or it can be located outside of the vehicle 12, such as a monitor in electrical communication with a personal computer, or it can be integrated with a portable wireless device, such as a cellular phone or PDA—to name a few examples. It is possible that the name of each vehicle service facility or a graphical icon representing each vehicle service facility can appear as a hyperlink in the email message; upon clicking on or accessing that hyperlink the user can receive additional information about each vehicle service facility. The information that identifies the name of one or more vehicle service facilities can also include a graphical map and an indicator, such as a dot, that identifies the location of the vehicle service facility with respect to the surrounding area and/or the vehicle 12 or other specified address. The graphical map can also take the form of a street-view image representing the vehicle service facility. The method 200 proceeds to step 240.

At step 240, a chosen vehicle service facility selection is received from the vehicle telematics service subscriber. After receiving the offered vehicle service facilities in the message, the vehicle telematics service subscriber selects one that he or she would like to service the vehicle 12. This selection can be made by clicking a hyperlink embedded in the email. Upon selecting the vehicle service facility, that selection can be transmitted to the central facility (e.g. call center 20) which can prepare to provide driving directions to the vehicle telematics service subscriber. The method 200 proceeds to step 250.

At step 250, the location of the vehicle 12 operated by the vehicle telematics service subscriber is determined. The present location of the vehicle 12 can be verified by the call center 20. That way, an initial point from which driving directions will be determined can be identified. The initial point can be determined by receiving GPS coordinates from the vehicle 12 that are generated by the GPS module 40. These coordinates can be sent by the vehicle 12 over the wireless carrier system 14 as is known in the art. The method 200 proceeds to step 260.

At step 260, turn-by-turn directions between the location of the vehicle 12 and the chosen selection are generated. Given the location of the vehicle 12 and the location of the chosen vehicle service facility, turn-by-turn directions can be generated. These directions can be generated in any one of a number of ways. For instance, the turn-by-turn directions can be generated at the call center 20 and sent to the vehicle 12 over the wireless carrier system 14. That way, when the vehicle telematics service subscriber operates the vehicle 12, the turn-by-turn directions can be ready to direct the subscriber to the vehicle service facility. The turn-by-turn directions can be provided to the vehicle telematics unit 30, which can convey those directions to the vehicle telematics service subscriber using vehicle hardware described above. In another embodiment, the turn-by-turn directions can be provided to the vehicle telematics service subscriber located outside of the vehicle 12. In that case, step 250 can be optionally omitted and the call center 20 or other central facility can calculate turn-by-turn directions between a given address and the selected vehicle service facility without determining the location of the vehicle 12. The given address can be entered at the same time the vehicle service facility is selected or it can be accessed from a previously-saved profile created by the vehicle telematics service subscriber and saved at the call center 20. Although providing turn-by-turn directions to the vehicle telematics service subscriber outside of the vehicle has been described without performing step 250, it should also be appreciated that directions can be provided to the subscriber outside of the vehicle by including step 250. In that case, the call center 20 could determine the location of the vehicle 12 as described above, calculate the turn-by-turn directions based on that location, and send the directions to the vehicle telematics service subscriber in an electronic message, such as an email. This email can include text-based commands or instructions or could include a hyperlink that provides turn-by-turn directions from any one of a number of online/web-based map websites, such as Google™ maps. And the email can be received at a variety of places, such as a PDA or personal computer. The method 200 proceeds to step 200.

At step 270, the turn-by turn directions are presented to the vehicle telematics service subscriber. If presented in the vehicle 12, the turn-by-turn directions can be received by the vehicle telematics unit 30 and presented audibly through the vehicle audio system 36 and/or visually through vehicle display 38. It is also possible to send the turn-by-turn directions to the vehicle telematics service subscriber in an email or other electronic message. In those cases, the turn-by-turn directions can be a list of text-based commands or instructions that can be displayed on a processing device, such as a PDA or mobile phone, or printed on paper using an attached printer. That way, the vehicle telematics service subscriber can receive the turn-by-turn directions without using the vehicle telematics unit 30 and can portably carry those directions with him or her. The method 200 then ends.

It is to be understood that the foregoing is a description of one or more preferred exemplary embodiments of the invention. The invention is not limited to the particular embodiments disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiments will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of providing directions to a vehicle service facility, comprising the steps of:
   (a) receiving at a call center vehicle operating data sent from a vehicle telematics unit;
   (b) generating at the call center a vehicle service message associated with the vehicle operating data, wherein the vehicle service message includes a plurality of vehicle service alerts, wherein at least two of the service alerts are associated with different vehicle subsystem concerns;
   (c) transmitting the vehicle service message from the call center to a vehicle telematics service subscriber using the telematics unit;
   (d) obtaining the location of the vehicle;
   (e) applying a minimum capability threshold at the call center, wherein the minimum capability threshold determines, based on the at least two service alerts and the vehicle location, at least one vehicle service facility that is capable of remedying all the vehicle service alerts; and
   (f) providing turn-by-turn directions from the location of the vehicle to the at least one vehicle service facility.

2. The method of claim 1, wherein the vehicle subsystem concern is selected from: a vehicle tire-related subsystem concern, a vehicle fuel-related subsystem concern, a vehicle engine oil-related concern, a vehicle lighting-related concern, a vehicle air filter-related concern, a vehicle sparkplug-related concern, a vehicle cleaning-related concern, a vehicle engine diagnosis-related concern, or a vehicle collision-related concern.

3. The method of claim 1, further comprising the step of identifying one or more services provided by the vehicle service facility and associating the vehicle service facility in a database with the one or more identified services.

4. The method of claim 3, wherein the database is maintained at the call center.

5. The method of claim 1, further comprising the step of determining if a vehicle operated by the vehicle telematics service subscriber is covered by a warranty and, if so, offering a vehicle service facility to the vehicle telematics service subscriber that honors the warranty.

6. The method of claim 1, wherein turn-by-turn directions are provided to the vehicle telematics service subscriber in an email message that includes vehicle diagnostic results.

7. The method of claim 1, wherein turn-by-turn directions are provided to the vehicle telematics service subscriber as a hyperlink in an email message.

8. The method of claim 1, wherein turn-by-turn directions are provided to the vehicle telematics service subscriber as text-based commands shown on a display in a vehicle or audibly recited in the vehicle.

9. The method of claim 1, wherein the turn-by-turn directions are included in an email as a geographical map.

10. A method of providing directions to a vehicle service facility, comprising the steps of:
    (a) generating at a call center a vehicle service message associated with vehicle operating data for a vehicle, wherein the vehicle service message includes at least one vehicle service alert associated with a vehicle subsystem concern;
    (b) determining at the call center that the vehicle is covered by a vehicle warranty;
    (c) transmitting the vehicle service message from the call center to a telematics unit in the vehicle for receipt by a telematics service subscriber;
    (d) determining at the call center whether the vehicle subsystem concern of the at least one service alert is covered by the warranty;
    (e) if the vehicle subsystem concern is covered by the warranty, then offering the telematics service subscriber a choice of one or more vehicle dealerships for responding to the at least one vehicle service alert;
    (f) otherwise, offering the vehicle telematics service subscriber a choice of one or more aftermarket vehicle service providers in addition to one or more dealerships for responding to the at least one vehicle service alert; and
    (g) after the vehicle telematics service subscriber chooses a vehicle dealership or aftermarket vehicle service provider, providing turn-by-turn directions from the location of the vehicle to the chosen vehicle dealership or aftermarket vehicle service provider.

11. The method of claim 10, wherein the vehicle subsystem concern is selected from: a vehicle tire-related subsystem concern, a vehicle fuel-related subsystem concern, a vehicle engine oil-related concern, a vehicle lighting-related concern, a vehicle air filter-related concern, a vehicle sparkplug-related concern, a vehicle cleaning-related concern, a vehicle engine diagnosis-related concern, or a vehicle collision-related concern.

12. The method of claim 10, further comprising the step of identifying one or more services provided by the vehicle dealership or aftermarket vehicle service provider and associating the dealership or aftermarket vehicle service provider in a database with the one or more identified services.

13. The method of claim 12, wherein the database is maintained at a call center.

14. The method of claim 10, wherein turn-by-turn directions are provided to the vehicle telematics service subscriber as a hyperlink in an email message.

15. The method of claim 10, wherein turn-by-turn directions are provided to the vehicle telematics service subscriber as text-based commands shown on a display in a vehicle or audibly recited in the vehicle.

16. The method of claim 10, wherein the turn-by-turn directions are included in an email as a geographical map.

* * * * *